INVENTOR.
Otto Mueller
BY
Harness, Dickey & Pierce
ATTORNEYS.

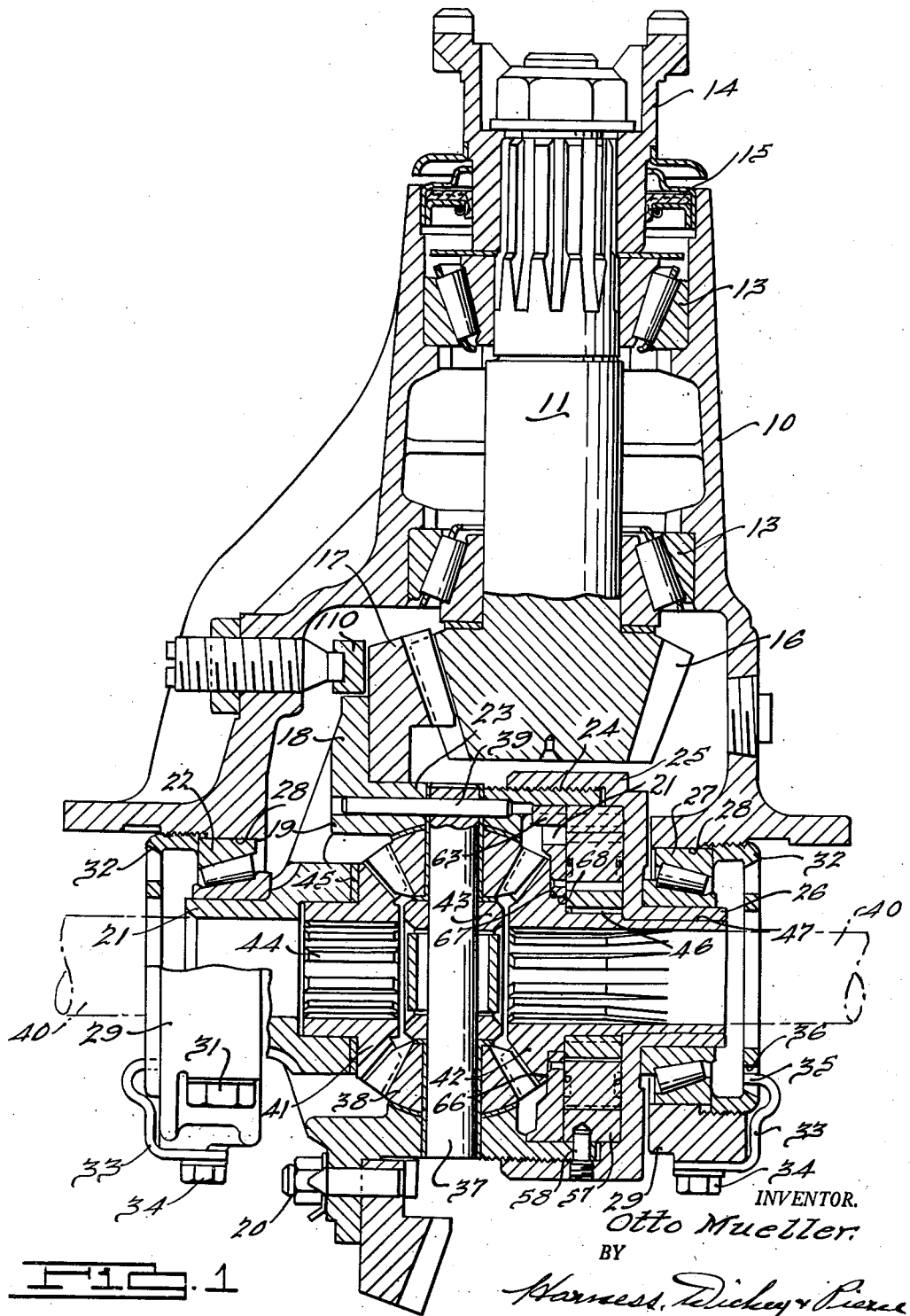

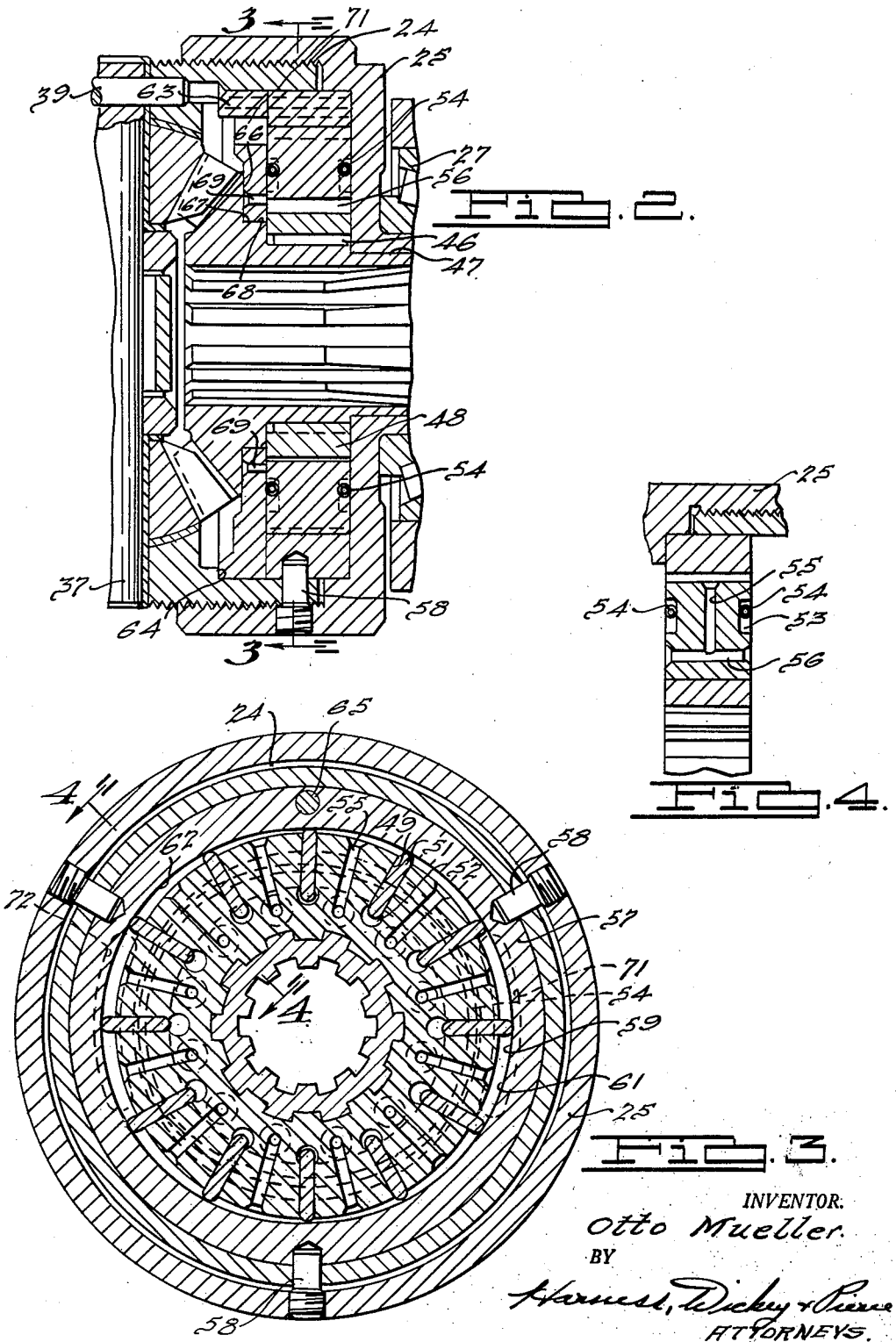

United States Patent Office 2,808,739
Patented Oct. 8, 1957

2,808,739
CONTROL FOR DIFFERENTIAL DRIVE
Otto Mueller, Dearborn, Mich.
Application April 3, 1953, Serial No. 346,660
7 Claims. (Cl. 74—711)

This invention relates to differential drives for vehicles, and particularly to a differential vehicle drive having a positive drive and differential action on the two driven axles.

Difficulty has been experienced in the past when employing pinion and side gears in the drive for the two driven axles. The differential was necessary to permit one wheel to operate at a different speed from the other when the vehicle was driven around curves, over rough terrain, or when different diameter tires were used. When such differential was provided on the axles, the drive to one wheel was interrupted as the other wheel spun when it lost traction due to mud, ice, and like conditions. Many attempts have been made to provide means for locking the two driven axles together while maintaining a differential action therebetween, but up to the present time no known structure has been provided which satisfactorily accomplishes such combination of actions.

The present invention pertains to the application of a fluid mechanism to the differential assembly, so constructed and applied thereto that complete control of the driving of the two driven shafts is maintained at all times, which applies torque to both wheels while permitting a differential action to occur therebetween when such action is required. The fluid mechanism embodies a vane type rotor mounted within a compression ring and suitably ported to operate on the oil normally provided in the differential housing. The ring is ported to admit the oil to within cavities provided between the ring and the rotor where it is operated on by the vanes, which applies pressure to the oil and forms a lock between the rotor and the ring. In this arrangement, the rotor and ring form an automatic clutch for locking the differential case and the operation of the pinion gears relative to the side gears. Positive control means may be provided for determining the oil pressure, which embodies a spring loaded relief valve. When the pressure of the oil opens the relief valve, the differential action may occur between the two side gears. The same result may be obtained by permitting a leakage of the oil under pressure, which will occur when the pressure has reached a predetermined amount. The leakage will permit the differential action between the two side gears when relatively moved at slow speed, but when one of the wheels attempts to spin, the fast relative movement between the rotor and ring, which is attempted to occur, will be blocked by the inability of any further rate in oil leakage. With this construction, the differential mechanism functions in the normal manner to permit one wheel to rotate at a different speed relative to the other wheel while the vehicle is being driven but will prevent either of the wheels from spinning relative to the other wheel in view of the locking or clutching of the rotor with the ring of the fluid actuated mechanism. This relationship causes both wheels to have approximately the same torque applied thereto in all conditions of operation of the wheels.

Accordingly, the main objects of the invention are: to apply torque to both axles of a vehicle at all times regardless of the difference in traction on the wheels while permitting differential movement therebetween; to provide a fluid actuated mechanism in the differential assembly which is effective to lock both of the driven axles together so that torque may be applied to both axles at all times while permitting differential movement therebetween; to employ the fluid in the housing of a differential for operating a fluid actuated clutch which maintains a driving relation between the two axles while permitting a differential movement therebetween; to secure one element of a fluid actuated clutch to the side gear of a differential assembly and the other element thereof to the differential case which permits differential movement between wheels when required but which locks the side gear and case to have torque applied in substantially equal amounts to the driven axles irrespective of the difference in traction on the wheels driven thereby; to provide a fluid actuated locking member between the operating elements of a differential to control the differential movement of the axles by the amount of fluid which is by-passed from the mechanism, so constructed that the mechanism is effective to provide the control in both the forward or reverse movement of the vehicle, and, in general, to provide a control mechanism for a differential of a vehicle which is simple in construction, positive in operation, and economical of manufacture.

Other objects and features of novelty of the invention will be specifically pointed out or will become apparent when referring, for a better understanding of the invention, to the following description, taken in conjunction with the accompanying drawings, wherein:

Figure 1 is a sectional view through a differential assembly, having a fluid actuated mechanism applied thereto embodying features of the present invention;

Fig. 2 is an enlarged, broken view of a portion of the structure illustrated in Fig. 1;

Fig. 3 is a sectional view of the structure illustrated in Fig. 2, taken on the line 3—3 thereof;

Fig. 4 is an enlarged, broken sectional view of the structure illustrated in Fig. 3, taken on the line 4—4 thereof;

Figure 5:
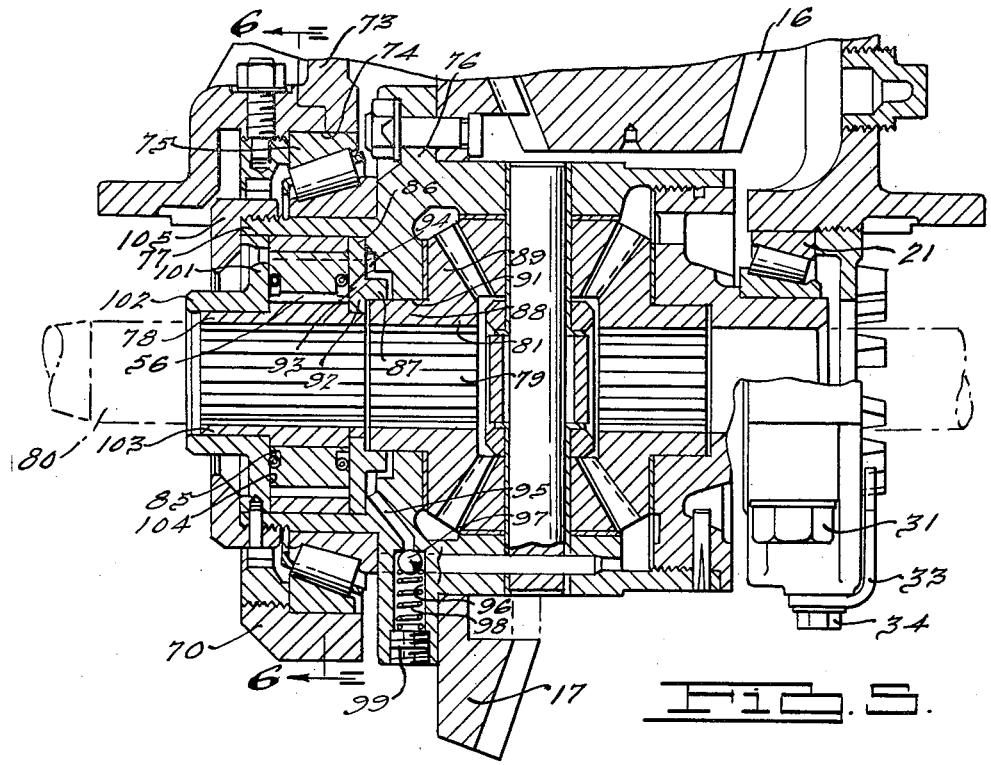
Fig. 5 is a broken view of structure, similar to that illustrated in Fig. 1, showing another form which the invention may assume.

A differential housing 10 has a stub shaft 11 mounted therein on bearings 13. The stub shaft has a coupling 14 on the outer end which is connectible to the drive shaft of a vehicle and is sealed to the end of the housing by a sealing element 15. The stub shaft 11 has a pinion 16 on the forward end, the teeth of which engage the teeth of a ring gear 17 secured to a flange 18 projecting from one side of a differential case 19 by suitable bolt assemblies 20. The case 19 has a hollow stem 21 which is mounted in a bearing 22. The main body 23 of the case has a threaded end 24 to which a threaded cap 25 is secured. The cap 25 has a hollow stem 26 in alignment with the stem 21 which is mounted in a bearing 27. The bearings are supported in semicylindrical apertures 28 in the housing 10, enclosed in the semicylindrical apertures in caps 29. A pair of studs 31 secures the caps 29 on the housing 10 in position to secure the bearings 22 and 27 in the apertures 28. End caps 32, threaded into the apertures formed by the housing 10 and caps 29, secure the case assembly against lateral displacement. After adjustment, locking clamps 33 are secured on the caps 29 by studs 34, with the ends 35 of the clamps extending in one of a plurality of apertures 36 provided in the caps 32.

The body 23 of the case 19 has a shaft 37 extending therethrough, forming oppositely disposed stub shafts on which a pair of pinion gears 38 are mounted. A pin 39 extends through an aperture in the differential case and through the shaft 37 near one end thereof. The shaft 37 forms the driving member through which torque is applied to the driven shafts of the vehicle. The pinions 38 on the shaft 37 form a floating key which produces the driving relation between the shaft 37 and the side gears 41 and 42. While differentials are provided having only the two pinions 38 driven from a single shaft 37, in the present arrangement a pair of additional stub shafts, not illustrated, are mounted on a collar 43 through which the shaft 37 extends, which collar carries the stub shafts in 90° relationship to the shaft 37 for projection through apertures in the body 23 of the case 19. After the stub shafts have been inserted in the apertures in the body 23, and those in the collar 43, similar pins 39 retain the shafts in assembled relation. The drive also occurs from the case to the additional stub shafts and pinions 38 which are mounted thereon. It is to be understood that the shaft 37 and the two stub shafts and collar 43 are often provided as a unit spider, with the four pinions 38 mounted directly thereon. In such an arrangement, the body 23 of the case is split parallel to the stub shafts and bolted together after assembly.

The side gears 41 and 42 have teeth thereon disposed in mesh with the teeth of the pinions 38 and are provided with a splined opening 44 for engaging splines on the end of the axle shafts 40 in driving relation thereto. The side gear 41 is rotatably mounted in the case 19, with a thrust washer 45 therebetween for taking the thrust from the pinions 38. The side gear 42 has a splined shoulder 46 and a bearing surface 47, the latter of which is journaled in the stem 26 of the cap 25 which forms a part of the case 19 for relative rotation therein.

The splined shoulder 46 on the side gear 42 has a rotor 48 secured thereon in splined engaged relation as illustrated in Fig. 2. The rotor is provided with a plurality of slots 49, herein illustrated as twelve in number, although it is to be understood that the number of such slots may be varied. The slots receive vanes 51 mounted for movement outwardly and inwardly therein. The bottom of the slots 49 is enlarged to form a well 52 at the inner end of each of the vanes 51 in which oil will collect and apply a pressure to the end of the vanes to force them outwardly as the oil bleeds past the wall of the case and the plate 63, which will be described hereafter. Notches 53 are provided in the sides of the vanes for receiving resilient means 54 which urge the vanes outwardly so that the outer ends of the vanes will engage the inner surface of the ring 57 at low R. P. M. The resilient means 54 herein illustrated is an O-ring, a spring wire formed in a circle, or a coiled wire disposed annularly. The resilient means is so proportioned as to exert an outward force on the vanes at all times. Apertures 55 extend inwardly from the periphery of the rotor between the slots 49, communicating with laterally disposed apertures 56 near the inner edge of the rotor. Thus, the fluid trapped by a vane will be forced into the apertures 55 and 56.

A compression ring 57 is mounted within the end of the body 23 of the case 19, secured in position by a plurality of locking studs 58. The internal surface 59 of the ring has two oppositely disposed compression surfaces 61 and 62 generated in such form as to maintain uniform pressure on the trapped oil.

A control plate 63, which is made of bronze or like bearing material, is mounted within the body 23 of the case 19 against a shoulder 64 thereof, against which the rotor 48 and ring 57 are retained by the cap 25 of the case. The plate 63 is secured to the ring 57 by a pin 65 to maintain the ring and plate in a desired angular position relative to each other. The plate 63 forms a thrust surface for the shoulder 66 of the side gear 42, the inner surface 67 of which forms a bearing on the annular surface 68 of the side gear 42. A plurality of apertures 69 are provided through the plate 63 in position to communicate with the apertures 56 in the rotor 48. The plate 63 also has elongated apertures 71 and 72 therein located substantially on the center of the compression surfaces 61 and 62. The apertures 71 and 72 form inlet ports for admitting the oil within the differential housing to between the peripheral face of the rotor and the compression surfaces 61 and 62. The oil is picked up by the vanes 51 which are retained in contact with the compression surfaces at all times, either by the spring means 54, by centrifugal force, or by the fluid under pressure within the walls 52. The vanes force the oil into the restricted area at one or the other end of the compression surfaces 61 and 62, depending upon which direction the rotor or case is being relatively driven, and the oil thus pressurized is forced through the apertures 55 and 56 as long as leakage occurs from the orifice 56 between the cap 25 and the plate 63 and between the surface 47 on the side gear 42 and the stem 26, which thereby lubricates the surface 47. When the relative rotation between the rotor 48 and ring 57 is substantial, the oil under pressure, not being able to escape from the aperture 56 at any degree of volume, will cause a lock to occur between the rotor 48 and ring 57, thereby applying substantially equal torque to both of the side gears 41 and 42 and driving the vehicle axles and wheels at substantially the same speed. It is only when the relative rotation between the rotor 48 and the ring 57 occurs at low speed, such as produced when one wheel moves faster than the other when the vehicle is rounding a turn, that the small amount of trapped oil under pressure will be expelled through leakage, permitting the rotor to turn relative to the ring 57 without locking and permitting a differential movement to occur between the axle shafts and wheels.

It is to be understood that the same action occurs between the rotor 48 and ring 57 when the vehicle is reversed from that occurring when the vehicle is driven forward. It is further to be understood that in either direction of motion of the vehicle, the movement between the rotor 48 and ring 57 in rotation is relative so that the same locking relationship therebetween occurs whether the rotor is the driven element or whether the ring 57 is the driven element in either the forward or reverse movement of the vehicle. Thus, it will be apparent that if one wheel of the vehicle is on an icy, wet, muddy, or otherwise slippery surface, that even though the traction is removed from the wheel, torque will still be applied in substantially equal amounts to both wheels so that the wheel having traction can move the vehicle from the slippery surface. It will be also apparent that when a wheel driven by the presently used differentials has no traction, the motor is no longer effective as a brake for the vehicle. When using the fluid actuated mechanism of the present invention, the engine is available at all times for braking the vehicle. Thus, in all conditions of operation of the vehicle, positive torque is applied to both axles and wheels while a differential action may occur therebetween.

Figure 6:
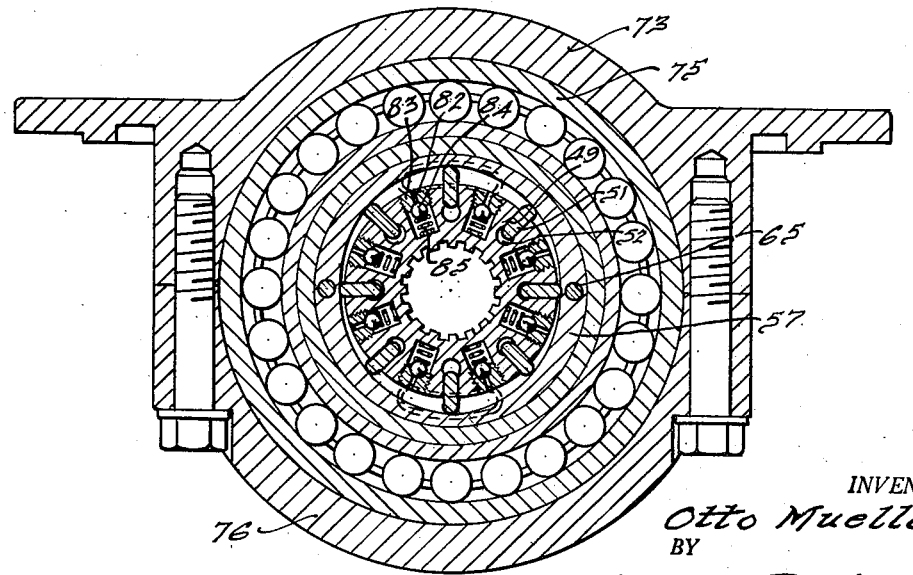
Fig. 6 is a sectional view of the structure illustrated in Fig. 5, taken on the line 6—6 thereof.

A further form of the invention is illustrated in Fig. 5, that wherein the fluid actuated mechanism is placed on the ring gear side of the assembly rather than on the opposite side thereof, as illustrated in the foregoing figures. In this arrangement, a housing 73 has a semicylindrical opening 74 therein, enlarged for receiving and supporting a large roller thrust bearing 75. A cap 70 is provided for completing the circular opening in the same manner as that of the structure shown in Figs. 1 to 4. A differential case 76 has a hollow stem 77 journaled in the bearing 75. A rotor 78 has a splined opening conforming to a splined opening 79 in a side gear 81 so that the rotor and side gear will be locked together by the splined end of an axle shaft 80 when inserted therein. The rotor has slots 49 and vanes 51 therein operating in a ring 57, the same as illustrated in Fig. 3. Between the vanes 51, laterally disposed apertures 56 are provided communicating with an aperture 82 in threaded plugs 83 located midway between the vanes 51. A ball 84 is disposed beneath each of the threaded plugs 83 and are urged thereagainst by springs 85. The spring-pressed balls form check valves, permitting fluid to pass through the passageway 82 from the peripheral edge of the rotor and preventing the fluid from passing outwardly through the aperture. A plate 86, made of bronze or other bearing material, is mounted against a shoulder of the case 76, with a rearwardly extending annular flange 87 which forms a bearing with the outer surface of a hub 88 on the side gear 89 which is supported in a bore 91 of the case 76. The plate 86 has an inner annular surface 92 journaled on the rotor and an outer face abutting the side of the rotor 78 and the compression ring 57 as illustrated in Fig. 6. A plurality of apertures 93 are provided through the plate 86 in communication with the apertures 56 through the rotor body. The fluid passing from the aperture 56 through the apertures 93 builds up a pressure within the pocket 94 which has a substantially greater effective area than that at the engaging portions of the ring and rotor therewith so that such greater pressure will urge the plate 86 into sealed relation to the sides of the rotor and ring, to thereby prevent leakage of fluid under pressure therefrom. An aperture 95 extends from the well 94 to a recess 96 in the case 76. A ball 97 is supported in the end of the aperture 96 by a spring 98, the pressure of which may be regulated by a pair of hollow plugs 99 which may be adjusted and locked relative to each other. The pressure applied to the ball regulates the pressure on the oil which must be reached before it is relieved so that a differential action can occur between the shafts to which the torque is applied.

A second bearing plate 101 is mounted on the forward side of the rotor 78, having an annular flange 102 which is disposed in bearing relation to the shouldered end 103 of the rotor 78. The plate has a face 104 which abuts the outer side of the compression ring 57 and rotor 78 against which it is retained by a nut 105 when threaded upon the differential case 76. Elongated apertures 71 and 72 extend through the plate 101, fixed in relation to the ring 57 by the pin 65 to function in the same manner as the plate 63 of Figs. 1 to 4. The fluid operated mechanism thus provided functions in the same manner as that illustrated and described in Figs. 1 to 4, the difference between the two structures residing primarily in the use of leakage in the structure of Figs. 1 to 4 for permitting the differential action between the driven shafts, while in the structure of Figs. 5 and 6 leakage is prevented from occuring and the by-passing of fluid past the ball 97 is relied upon for permitting the differential action to occur between the shafts. Further, the fluid mechanism illustrated in Figs. 5 and 6 is on the opposite side of the assembly from that illustrated in Figs. 1 to 4, being on the side carrying the ring gear of the assembly. It will be noted in this arrangement that the adjustable thrust mechanism 110 illustrated in Fig. 1 heretofore applied to back up the ring gear of the differential assemblies is eliminated since the thrust resulting from the operation of the teeth of the pinion 16 on the teeth of the ring gear 17 is substantially at 90° to the large bearing 75 which is of sufficient strength to back up and take such thrust.

What is claimed is:

1. In a differential having a side gear, a plate on said side gear rotatable relative thereto, a rotatable element of a pump fixed relative to said side gear to rotate therewith, and a compression element of said pump rotatable with said plate which is laterally shiftable relative thereto and to said rotatable element, said plate having an aperture therethrough for delivering fluid into the area between the rotatable element and compression element in which the fluid is received and compressed.

2. In a differential having a side gear, a pump having one element on said side gear, a plate between said pump and side gear enclosing one side face of said pump, a case about said pump and said side gear enclosing the opposite side face of said pump, said plate having a passageway therethrough for delivering fluid to the pump which produces pressure thereon, the fluid under pressure when delivered between the plates and side gear forcing said plate against said pump and said pump against said casing to thereby reduce the leakage occuring therebetween as the relative movement between said gear and case increases.

3. In a differential having two relatively rotatable elements, a compression ring having a plurality of compression areas secured to one rotatable element, a rotor member secured to the other rotatable element, means for compressing fluid in said areas when said rotor member and said compression ring are relatively rotated, a plate abutting one side of said rotor and compression ring, and subject to differential fluid pressures from said areas to press said plate against said rotor and compression ring.

4. In a differential having two relatively rotatable elements, a compression member secured to one rotatable element, a rotor member secured to the other rotatable element, means for compressing fluid when said rotor member and said compression member are relatively rotated, a plate abutting one side of the compression member and rotor member and having a passageway therethrough to conduct fluid to an intake area between said compression member and rotor member, said plate being subject to differential fluid pressures resulting from relative rotation of said members to press said plate against said rotor member and compression member and reduce the leakage therebetween.

5. In a differential having two relatively rotatable elements, a compression member secured to one rotatable element, a rotor member secured to the other rotatable element, means for compressing fluid when said rotor member and said compression member are relatively rotated, and a plate abutting one side of the compression member and rotor member and having a passageway extending therethrough through which fluid passes into the intake area between said compression member and rotor member, said plate being arranged to rotate with said compression member and subject to pressure resulting from relative rotation between said members whereby it is pressed laterally against said compression member and rotor member.

6. In a differential having pinions and a side gear, said side gear having a shoulder, a plate on said side gear adjacent to said shoulder, pump elements having a rotatable part fixed relative to said side gear and engaging said plate, said plate abutting one face of said pump elements, and being subject to differential fluid pressure resulting from operation of said pump to press said plate against said pump elements, a case on said differential having a portion abutting the opposite face of said pump elements, said plate having an intake aperture through which fluid is delivered to said pump elements.

7. In a differential having a side gear, relatively movable pump elements having one part rotatable with said side gear, a case in said differential supporting another element of said pump for rotation therewith, and a plate abutting one side face of said pump, the opposite side face of the pump abutting said case, said plate having fluid delivery apertures therethrough, the elements being so related that axial thrust of the side gear applies a clamping force to said plate to clamp said pump elements between the plate and case thereby decreasing fluid leakage therebetween and increasing the pressure in the fluid operated on by said pump elements.

(References on following page)

References Cited in the file of this patent

UNITED STATES PATENTS

| | | |
|---|---|---|
| 473,444 | Barney | Apr. 26, 1892 |
| 1,156,819 | Rich | Oct. 12, 1915 |
| 1,466,320 | West | Aug. 28, 1923 |
| 1,997,788 | Friedell | Apr. 16, 1935 |
| 2,035,514 | Staats | Mar. 31, 1936 |
| 2,206,907 | Loughridge | July 9, 1940 |
| 2,207,310 | Ballamy | July 9, 1940 |
| 2,247,410 | Ross | July 1, 1941 |
| 2,397,374 | Schlicksupp | Mar. 26, 1946 |
| 2,542,682 | Kloss | Feb. 20, 1951 |
| 2,562,177 | De La Hitte | July 31, 1951 |
| 2,571,063 | Roth | Oct. 9, 1951 |
| 2,637,275 | McFarland | May 5, 1953 |

FOREIGN PATENTS

| | | |
|---|---|---|
| 499,048 | Great Britain | Jan. 18, 1939 |